(12) United States Patent
Ankur et al.

(10) Patent No.: US 11,875,109 B1
(45) Date of Patent: Jan. 16, 2024

(54) MACHINE LEARNING (ML)-BASED SYSTEM AND METHOD FOR FACILITATING CORRECTION OF DATA IN DOCUMENTS

(71) Applicant: HIGHRADIUS CORPORATION, Houston, TX (US)

(72) Inventors: Aditya Ankur, Hyderabad (IN); Rajesh Krishnan, Hyderabad (IN); Aishwarya Kumar, Hyderabad (IN); Mohit Bansal, Hyderabad (IN)

(73) Assignee: HIGHRADIUS CORPORATION, Houston, TX (US)

( * ) Notice: Subject to any disclaimer, the term of this patent is extended or adjusted under 35 U.S.C. 154(b) by 0 days.

(21) Appl. No.: 17/817,680

(22) Filed: Aug. 5, 2022

(51) Int. Cl.
  *G06N 5/022* (2023.01)
  *G06F 40/174* (2020.01)
  *G06F 40/205* (2020.01)
  *G06Q 40/12* (2023.01)

(52) U.S. Cl.
  CPC .......... *G06F 40/174* (2020.01); *G06F 40/205* (2020.01); *G06N 5/022* (2013.01); *G06Q 40/12* (2013.12)

(58) Field of Classification Search
  CPC ..... G06F 40/174; G06F 40/205; G06Q 40/12; G06N 5/022
  See application file for complete search history.

(56) References Cited

U.S. PATENT DOCUMENTS

| | | | |
|---|---|---|---|
| 9,449,044 | B1 | 9/2016 | Little et al. |
| 9,767,354 | B2 | 9/2017 | Thompson et al. |
| 10,607,041 | B2 | 3/2020 | Sareen et al. |
| 11,367,008 | B2 * | 6/2022 | Rao ........................ G06F 16/285 |
| 2002/0156816 | A1 | 10/2002 | Kantrowitz et al. |
| 2020/0322800 | A1 * | 10/2020 | Ozanian ................. G06N 3/084 |
| 2020/0342221 | A1 * | 10/2020 | Sampath .............. G06V 30/412 |
| 2021/0374479 | A1 | 12/2021 | Zambetti, Jr. |
| 2021/0390258 | A1 * | 12/2021 | Turcato ................. G06F 40/211 |
| 2022/0121884 | A1 * | 4/2022 | Zadeh ................. G06V 10/764 |
| 2022/0300850 | A1 * | 9/2022 | Mendez ................. G06N 20/00 |
| 2023/0113752 | A1 * | 4/2023 | Jorlett ............... G06Q 20/4016 705/44 |
| 2023/0267273 | A1 * | 8/2023 | Theriappan ........... G06F 40/117 704/9 |

\* cited by examiner

*Primary Examiner* — David Phantana-angkool
(74) *Attorney, Agent, or Firm* — Jason C. Cameron

(57) ABSTRACT

A system and method for or facilitating correction of data in documents is disclosed. The method includes receiving one or more documents from and scanning the received one or more documents by using a document processing system for obtaining one or more mis-captured data fields. The method further includes obtaining a historical correction data and determining one or more deltas based on the obtained historical correction data by using a trained data correction-based ML model. Further, the method includes parsing the determined one or more deltas into one or more datasets, generating one or more correct data fields corresponding to the one or more mis-captured data fields and automatically replacing the one or more mis-captured data fields with the generated one or more correct data fields based on one or more predefined rules.

20 Claims, 9 Drawing Sheets

302

No. 119172
Check date: 8/5/19
(9219)

| Invoice | Description | Date | P.O. No. | Gross Amt. | Discount | Net amount |
|---|---|---|---|---|---|---|
| RTVI7146A | 777225048 | 06/28/19 | | -$1,096.70 | $0.00 | -$1,096.70 |
| RTV17231 | 777225048 | 07/09/19 | | -$136,438.30 | $0.00 | -$136,438.30 |
| RTV17273 | 777301192 | 07/22/19 | | -$165,222.98 | $0.00 | -$165,222.98 |
| RTV17274 | 777301192 | 07/22/19 | | -$1,125.90 | $0.00 | -$1,125.90 |
| 761695 | 761695 | 07/18/19 | | -$1,969.00 | $0.00 | -$1,969.00 |
| 761696 | 761696 | 07/18/19 | | -$1,897.00 | $0.00 | -$1,897.00 |
| 761697 | 761697 | 07/18/19 | | -$1,339.00 | $0.00 | -$1,339.00 |
| 761698 | 761698 | 07/18/19 | | -$1,294.00 | $0.00 | -$1,294.00 |
| 761699 | 761699 | 07/18/19 | | -$880.00 | $0.00 | -$880.00 |
| 761700 | 761700 | 07/18/19 | | -$619.00 | $0.00 | -$619.00 |
| 761701 | 761701 | 07/18/19 | | -$700.00 | $0.00 | -$700.00 |
| 761702 | 761702 | 07/18/19 | | -$700.00 | $0.00 | -$700.00 |
| 761703 | 761703 | 07/18/19 | | -$520.00 | $0.00 | -$520.00 |
| 761704 | 761704 | 07/18/19 | | -$520.00 | $0.00 | -$520.00 |
| 761705 | 761705 | 07/18/19 | | -$403.00 | $0.00 | -$403.00 |
| 772752 | 772752 | 06/21/19 | | -$300.00 | $0.00 | -$300.00 |
| 802569 | 802569 | 07/18/19 | | -$260.00 | $0.00 | -$260.00 |
| 9023644380 | 749227 | 06/14/19 | | $9,083.63 | $0.00 | $9,083.63 |
| | | | Totals | $3,152,481.06 | $0.00 | $3,152,481.06 |

FIG. 3

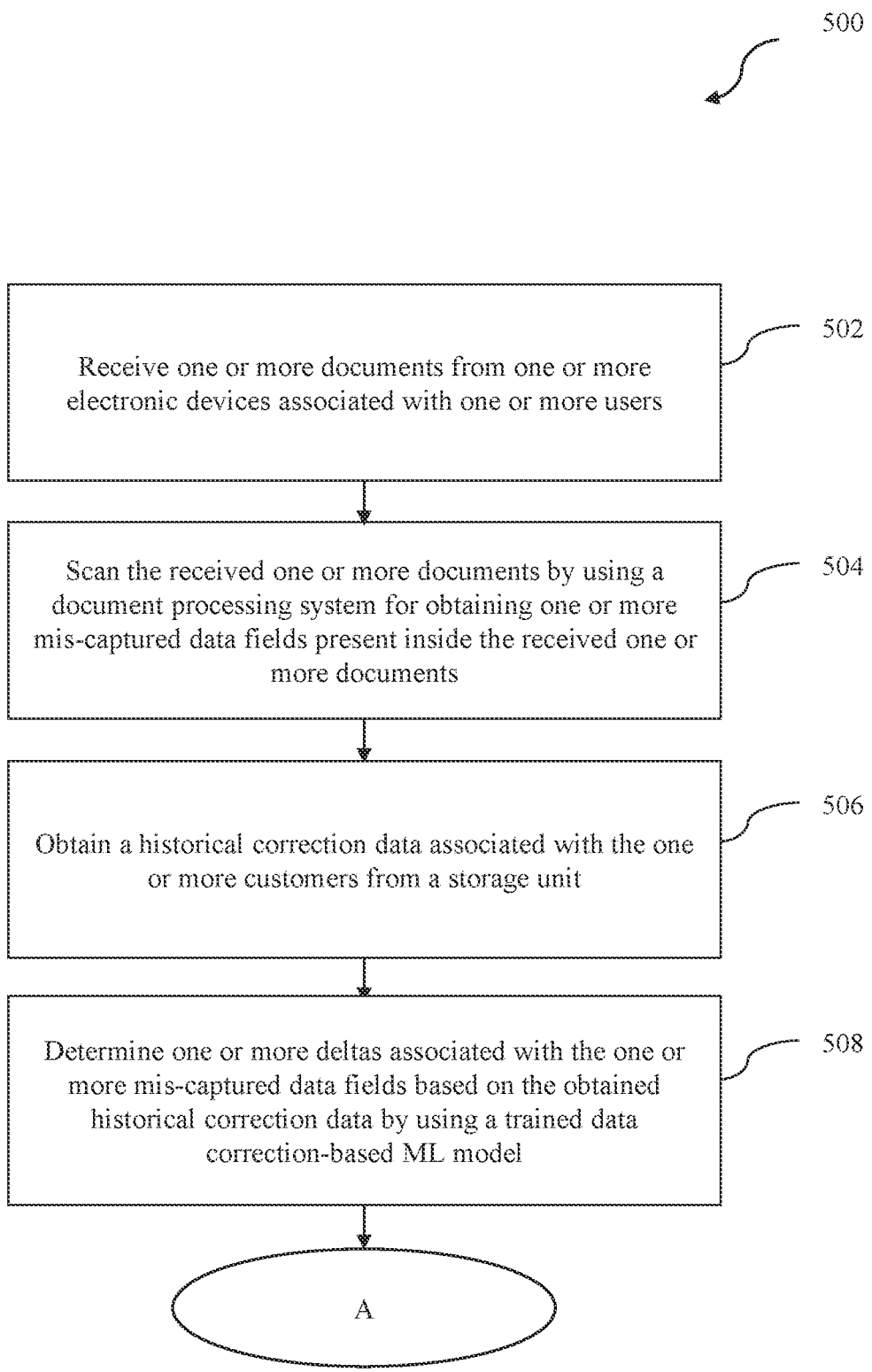
FIG. 5 (contd)

MACHINE LEARNING (ML)-BASED SYSTEM AND METHOD FOR FACILITATING CORRECTION OF DATA IN DOCUMENTS

FIELD OF INVENTION

Embodiments of the present disclosure relate to Machine Learning (ML)-based processing systems and more particularly relates to an ML-based system and a method for facilitating correction of data in documents.

BACKGROUND

In an order to cash cycle, a remittance is a proof of payment sent by a buyer to a seller detailing items or invoices against which the payment has been made. Automated information extraction from remittances is a critical step for cash applications. Generally, the automated extraction is performed by using a document processing system, such as an Optical Character Recognition (OCR) engine followed by a set of rules. The OCR engine scans the remittances and processes the scanned remittances to extract relevant information, such as payment information during a check loading process. The remittances include pre-printed document patterns including predefined fields filed by hand or machine printed characters. Further, the OCR engine reads content of the predefined fields and automatically extracts the information from the predefined fields of the remittances. However, check remittances often end up having a lot of errors due to poor image quality and fundamental limitations in the OCR engine.

Further, for example, in cases where the image is distorted, an improper scan from a poor-quality paper is prone to error. Conventional OCR engines fail to remove noises such as black spaces or garbage values which leads to uncertainties in output. Thus, clients end up manually correcting these errors. For example, the predefined fields captured by the OCR engine majorly includes invoice numbers, amount, invoice dates, discount amount, descriptions, customer's name, address, and the like depending on banks and customers. After the predefined fields are captured, Accounts Receivable (AR) documents are used for matching or validating against the predefined fields and closing a particular Invoice. However, due to poor image quality, limitations of current OCR technology or a combination thereof, the predefined fields captured might end up having errors. Since remittance information is critical to decide which invoices to close against which payments, the errors are required to be manually corrected by clients. This in turn flags the payment with an AR Match Failed (AMF) exception tag. Further, a cash analyst manually corrects or edits the incorrectly captured information from an exception handling user interface by looking at the remittance or check and hitting the AR again for a correct match. This generates a correction log data for the open invoices. This process requires a lot of user effort as the number of the remittances received is huge and the data present in the remittances is large. Thus, a lot of reference fields are required to be checked against to find a matching or close reference field that matches the invoice number. Hence, the manual correction of the errors is a time consuming, inefficient and a tedious task.

Hence, there is a need for an improved Machine Learning (ML)-based computing system for facilitating correction of data in documents, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a Machine Learning (ML)-based computing system for facilitating correction of data in documents is disclosed. The ML-based computing system includes one or more hardware processors and a memory coupled to the one or more hardware processors. The memory includes a plurality of modules in the form of programmable instructions executable by the one or more hardware processors. The plurality of modules include a data receiver module configured to receive one or more documents from one or more electronic devices associated with one or more users. The one or more documents are associated with one or more customers of the one or more users. The plurality of modules include a data processing module configured to scan the received one or more documents by using a document processing system for obtaining one or more mis-captured data fields present inside the received one or more documents. The one or more mis-captured data fields are in the form of one or more strings. Each of the one or more strings includes a set of characters. Further, the plurality of modules include a data obtaining module configured to obtain a historical correction data associated with the one or more customers from a storage unit. The historical correction data corresponds to one or more corrections made by the one or more users to correct wrongly captured data fields of a set of documents associated with the one or more customers. The plurality of modules also include a data determination module configured to determine one or more deltas associated with the one or more mis-captured data fields based on the obtained historical correction data by using a trained data correction-based ML model. The one or more deltas are used as one or more common correction patterns to be applied on the one or more strings of the one or more mis-captured data fields to correct the one or more mis-captured data fields. The plurality of modules includes a data parsing module configured to parse the determined one or more deltas into one or more datasets by using a data parsing technique. The one or more datasets include an instruction set, a position set and a variable set. The one or more datasets are human readable datasets. Further, the plurality of modules includes a data generation module configured to generate one or more correct data fields corresponding to the one or more mis-captured data fields based on the parsed one or more datasets by using the trained data correction-based ML model. The plurality of modules also include a data replacement module configured to automatically replace the one or more mis-captured data fields with the generated one or more correct data fields based on one or more predefined rules.

In accordance with another embodiment of the present disclosure, an ML-based method for facilitating correction of data in documents is disclosed. The ML-based method includes receiving one or more documents from one or more electronic devices associated with one or more users. The one or more documents are associated with one or more customers of the one or more users. The ML-based method includes scanning the received one or more documents by using a document processing system for obtaining one or more mis-captured data fields present inside the received one or more documents. The one or more mis-captured data fields are in the form of one or more strings. Each of the one or more strings includes a set of characters. Further, the ML-based method includes obtaining a historical correction data associated with the one or more customers from a storage unit. The historical correction data corresponds to one or more corrections made by the one or more users to correct wrongly captured data fields of a set of documents associated with the one or more customers. The ML-based method also includes determining one or more deltas associated with the one or more mis-captured data fields based on the obtained historical correction data by using a trained data correction-based ML model. The one or more deltas are used as one or more common correction patterns to be applied on the one or more strings of the one or more mis-captured data fields to correct the one or more mis-captured data fields. The ML-based method further includes parsing the determined one or more deltas into one or more datasets by using a data parsing technique. The one or more datasets include an instruction set, a position set and a variable set. The one or more datasets are human readable datasets. Further, the ML-based method includes generating one or more correct data fields corresponding to the one or more mis-captured data fields based on the parsed one or more datasets by using the trained data correction-based ML model. Furthermore, the ML-based method includes automatically replacing the one or more mis-captured data fields with the generated one or more correct data fields based on one or more predefined rules.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is an exemplary remittance image including a set of data fields, in accordance with an embodiment of the present disclosure;

Figure 1:
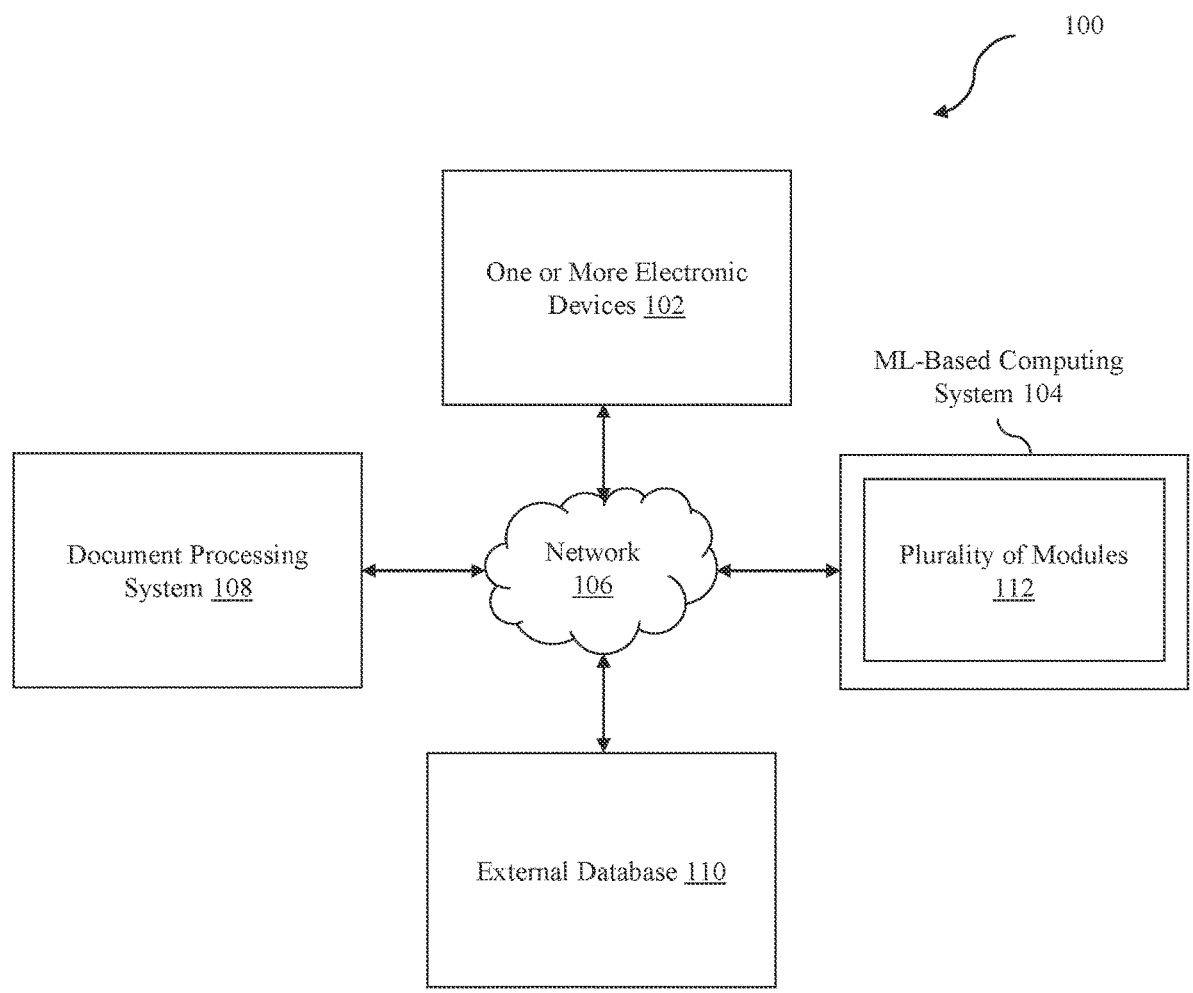
FIG. 1 is a block diagram illustrating an exemplary computing environment for facilitating correction of data in documents, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for facilitating correction of data in documents, in accordance with an embodiment of the present disclosure. According to FIG. 1, the computing environment 100 includes one or more electronic devices 102 associated with one or more users communicatively coupled to a Machine Learning (ML)-based computing system 104 via a network 106. In an exemplary embodiment of the present disclosure, the one or more users may include one or more analysts, business analysts, cash analysts, financial analysts, and the like. Further, the one or more electronic devices 102 are used by the one or more users for sending one or more documents to a document processing system 108. For example, the document processing system 108 may be an Optical Character Recognition (OCR) engine. In an embodiment of the present disclosure, the one or more documents may be one or more invoices, one or more remittance documents and the like. In an embodiment of the present disclosure, the ML-based computing system 104 automatically replaces one or more mis-captured data fields with one or more correct fields based on one or more predefined rules. Furthermore, the one or more electronic devices 102 may also be used by the one or more users to receive a set of correct data fields and a confidence score on user interface screen of the one or more electronic devices 102. The ML-based computing system 104 may be hosted on a central server, such as cloud server or a remote server. Further, the network 106 may be a Wireless-Fidelity (Wi-Fi) connection, a hotspot connection, a Bluetooth connection, a local area network, a wide area network or any other wireless network. In an exemplary embodiment of the present disclosure, the one or more electronic devices 102 may include a laptop computer, desktop computer, tablet computer, smartphone, wearable device, smart watch, and the like.

Further, the computing environment 100 includes an external database 110 communicatively coupled to the ML-based computing system 104 via the network 106. The external database 110 includes a set of documents. In an embodiment of the present disclosure, the set of documents are fetched from the external database 110 to train a data correction-based ML model. In an exemplary embodiment of the present disclosure, the set of documents may be set of invoices, set of remittance documents and the like. The computing environment 100 also includes the document processing system 108 communicatively coupled to the ML-based computing system 104 via the network 106. In an embodiment of the present disclosure, the data processing system extracts the one or more mis-captured data fields present inside the one or more documents.

Furthermore, the one or more electronic devices 102 include a local browser, a mobile application or a combination thereof. Furthermore, the one or more users may use a web application via the local browser, the mobile application or a combination thereof to communicate with the ML-based computing system 104. In an embodiment of the present disclosure, the ML-based computing system 104 includes a plurality of modules 112. Details on the plurality of modules 112 have been elaborated in subsequent paragraphs of the present description with reference to FIG. 2.

In an embodiment of the present disclosure, the ML-based computing system 104 is configured to receive the one or more documents from the one or more electronic devices 102 associated with the one or more users. The ML-based computing system 104 scans the received one or more documents by using the document processing system 108 for obtaining the one or more mis-captured data fields present inside the received one or more documents. The ML-based computing system 104 obtains a historical correction data associated with the one or more customers from a storage unit. Further, the ML-based computing system 104 determines one or more deltas associated with the one or more mis-captured data fields based on the obtained historical correction data by using a trained data correction-based ML model. The ML-based computing system 104 parses the determined one or more deltas into one or more datasets by using a data parsing technique. The ML-based computing system 104 generates the one or more correct data fields corresponding to the one or more mis-captured data fields based on the parsed one or more datasets by using the trained data correction-based ML model. The ML-based computing system 104 automatically replaces the one or more mis-captured data fields with the generated one or more correct data fields based on one or more predefined rules.

Figure 2:
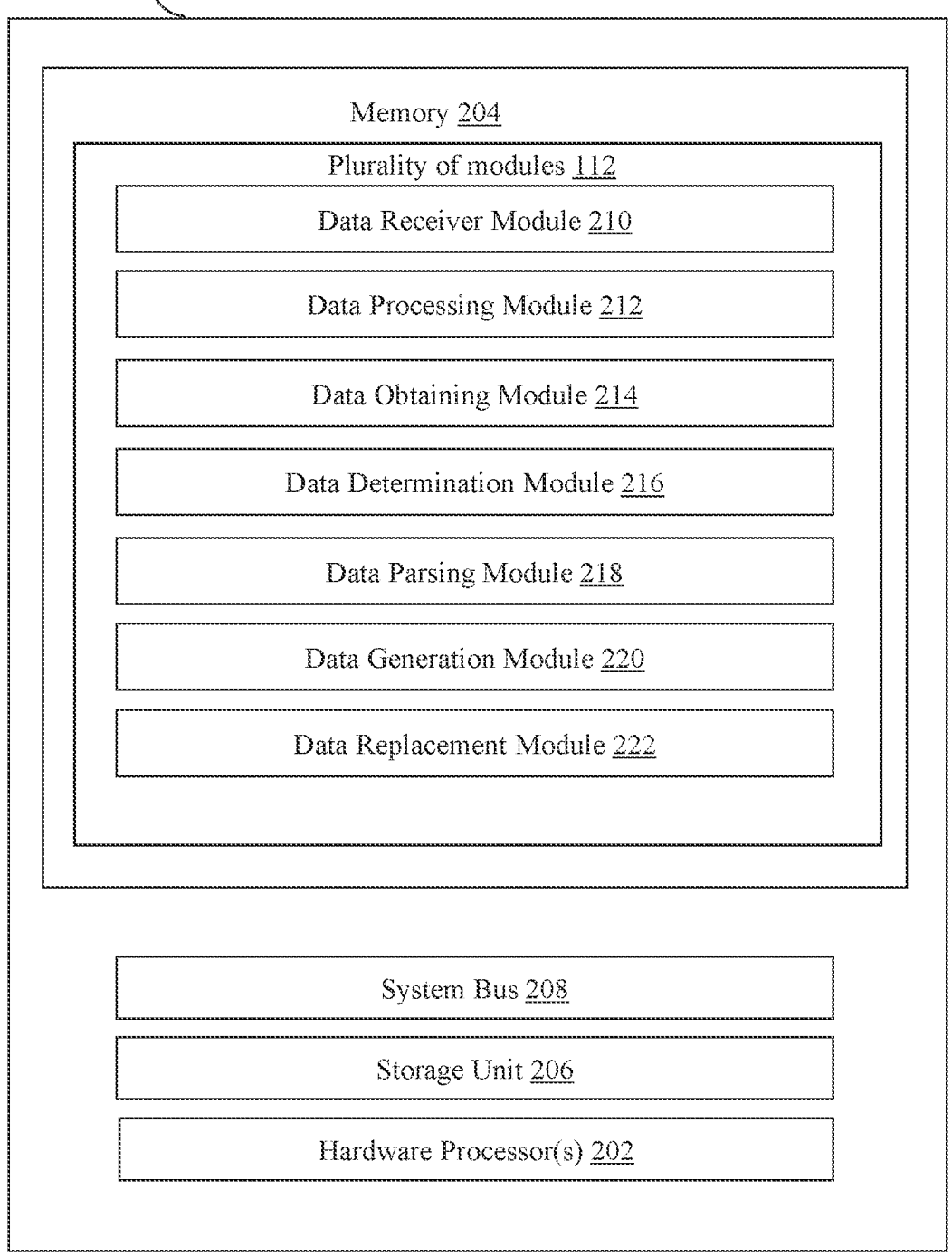
FIG. 2 is a block diagram illustrating an exemplary Machine Learning (ML)-based computing system for facilitating correction of data in documents, in accordance with an embodiment of the present disclosure.

FIG. 2 is a block diagram illustrating an exemplary Machine Learning (ML)-based computing system 104 for facilitating correction of data in documents, in accordance with an embodiment of the present disclosure. Further, the ML-based computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 112 in the form of programmable instructions executable by the one or more hardware processors 202. Further, the plurality of modules 112 includes a data receiver module 210, a data processing module 212, a data obtaining module 214, a data determination module 216, a data parsing module 218, a data generation module 220 and a data replacement module 224.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 112 stored in the form of machine-readable instructions on any of the above-mentioned storage media and may be in communication with and executed by the one or more hardware processors 202.

The storage unit 206 may be a cloud storage, a Structured Query Language (SQL) data store or a location on a file system directly accessible by the plurality of modules 112. The storage unit 206 may store the one or more documents, the one or more mis-captured data fields, the historical correction data, the one or more deltas, the one or more datasets, the one or more correct data fields, the one or more predefined rules, a set of correct data fields, a confidence score, one or more Accounts Receivable (AR) documents and the like.

The data receiver module 210 is configured to receive the one or more documents from the one or more electronic devices 102 associated with the one or more users. In an exemplary embodiment of the present disclosure, the one or more users may include one or more analysts, business analysts, cash analysts, financial analysts and the like. In an exemplary embodiment of the present disclosure, the one or more electronic devices 102 may include a laptop computer, desktop computer, tablet computer, smartphone, wearable device, smart watch, and the like. In an embodiment of the present disclosure, the one or more documents may be one or more invoices, one or more remittance documents and the like. The one or more documents are associated with one or more customers of the one or more users. In an embodiment of the present disclosure, the one or more customers share the one or more remittance documents with the one or more users to close one or more invoices raised against them. In an embodiment of the present disclosure, the one or more documents are in one or more formats. For example, the one or more formats include Portable Document Format (PDF), Joint Photographic Expert Group image (JPEG), Portable Network Graphics (PNG), Scalable Vector Graphics (SVG), and Web Picture format (WebP) and the like. In an exemplary embodiment of the present disclosure, the one or more documents include handwritten information, machine printed information, and the like.

The data processing module 212 is configured to scan the received one or more documents by using the document processing system 108 for obtaining the one or more mis-captured data fields present inside the received one or more documents. For example, the data processing system may be an OCR engine. In an embodiment of the present disclosure, the OCR engine is a technology that recognizes text inside images and scanned documents. In an embodiment of the present disclosure, the one or more mis-captured data fields are data fields inside the received one or more documents for which the OCR engine fails to recognize a set of characters while scanning the received one or more documents. In an embodiment of the present disclosure, the one or more mis-captured data fields are in the form of one or more strings. Further, each of the one or more strings includes the set of characters. For example, the one or more strings include letters, numerical digits, whitespaces, special characters, and the like. In scanning the received one or more documents by using the document processing system 108 for obtaining the one or more mis-captured data fields present inside the received one or more documents, the data processing module 212 extracts a set of data fields from the received one or more documents by using the document processing system 108. For example, the set of data fields may include invoice numbers, amount, invoice dates, discount amount, descriptions, customer's name, address and the like. Furthermore, the data processing module 212 compares the set of data fields of the received one or more documents with one or more data fields of one or more Accounts Receivable (AR) documents. For example, the one or more AR documents may be invoices. The data processing module 212 determines if the set of data fields are identical to the one or more data fields based on result of comparison. The data processing module 212 determines the one or more mis-captured data fields in the received one or more documents upon determining that the set of data fields are not identical to the one or more data fields. In an exemplary embodiment of the present disclosure, the one or more mis-captured data fields include invoice numbers, amount, invoice dates, discount amount, descriptions, customer's name, address, or a combination thereof. For example, the set of data fields are compared with the one or more data fields to close an open AR. When the result of comparison indicates that the set of data fields are not identical to the one or more data fields, the set of data fields are flagged with an AR Match Failed (AMF) exception tag. In an embodiment of the present disclosure, the AMF exception tag corresponds to a matching entry for a given payment that is not found in open AR and hence fail to close the invoice.

The data obtaining module 214 is configured to obtain the historical correction data associated with the one or more customers from the storage unit 206. In an embodiment of the present disclosure, the historical correction data corresponds to one or more corrections made by the one or more users to correct wrongly captured data fields of a set of documents associated with the one or more customers. The set of documents are past remittance documents associated with the one or more customers. For example, the one or more corrections may include removing a character from character strings of the wrongly captured data fields, adding a character in the character strings of the wrongly captured data fields and the like. In an embodiment of the present disclosure, the historical correction data is stored as log correction data in the storage unit 206. The Log correction data is captured for respective customer account and is cleaned as there is a likelihood of a lot of empty fields for both captured fields and corrected fields along with customer ID's. For example, when the log correction data includes cases where the captured fields and the corrected fields are having the same value, these cases are also removed.

In an embodiment of the present disclosure, upon analyzing the log correction data and the one or more data fields of the one or more AR documents, one or more observations are derived. The one or more observations include that the one or more corrections are made on both header and item level record. Further, the one or more observations include that the invoice number may be alphanumeric set of characters, such as 607189628, 557508854, 9R57C5748 and the like but majorly contains digits only. The one or more observations also include that incorrectly captured fields mainly include invoice numbers, amount, and invoice dates. The data is very high dimensional. Furthermore, the one or more observations include that remittance often includes close contenders for payment number, such as check number, credit memo number, advice number and the like. In an exemplary embodiment of the present disclosure, a data correction-based ML model is trained based on captured reference numbers. Further, the one or more observations include that probability estimation for an invoice number may include huge number of classes. For example, for an invoice number of length 10 there may be 35 such classes (26 letters and 10 digits) for correcting a single character. Thus, if there are 3 or 4 indexes where the OCR has mis-captured the characters, this class sample space may be too high. In an embodiment of the present disclosure, there are a lot of places where the captured field and corrected field values are the same. Thus, these cases are ignored for solution and capturing patterns. In an embodiment of the present disclosure, the one or more observations are considered while determining one or more deltas.

The data determination module 216 is configured to determine the one or more deltas associated with the one or more mis-captured data fields based on the obtained historical correction data by using the trained data correction-based ML model. In an exemplary embodiment of the present disclosure, the one or more deltas are used as one or more common correction patterns to be applied on the one or more strings of the one or more mis-captured data fields to correct the one or more mis-captured data fields. In an embodiment of the present disclosure, a string-matching technique may be used to find the difference between two string values. These differences i.e., the one or more deltas are then used as the one or more common correction patterns that could be applied to the one or more mis-captured data fields to correct them.

In an embodiment of the present disclosure, the one or more deltas are human readable differences to be applied on the on the one or more strings of the one or more mis-captured data fields to correct the one or more mis-captured data fields. Each line of the one or more deltas begins with a two-letter code having one or more meanings. For example, when a first character sequence i.e., a mis-captured data field is required to be converted to a second character sequence i.e., a correct data field, '−' represents a character unique to the first character sequence. Further, '+' represents a character unique to the second character sequence. Furthermore, ' ' represents a character common to both the first character sequence and the second character sequence. '?' represents a character absent in both the first character sequence and the second character sequence.

The data parsing module 218 is configured to parse or decode the determined one or more deltas into the one or more datasets by using a data parsing technique. In an exemplary embodiment of the present disclosure, the one or more datasets include an instruction set, a position set and a variable set. The one or more datasets are human readable datasets. Further, the instruction set is a binary encoding used to insert or delete a character. In an embodiment of the present disclosure, the instruction set includes a set of instructions that is required to be applied to a sequence to change it to another sequence. The set of instructions include digits '0''s i.e., deleting a character and ' 1''s i.e., inserting a character. The position set represents a string index at which the character gets deleted or inserted into. In an embodiment of the present disclosure, the position set includes logical indices from where to delete or insert the character based on the set of instructions. Furthermore, the variable set is the character that gets inserted or deleted from the position set. In an embodiment of the present disclosure, all the instruction set, the position set, and the variable set must be in accordance with their indices i.e., an instruction at index 'x' is meant for deleting or inserting the variable read from index 'x' from the position read from the index 'x'. In an exemplary embodiment of the present disclosure, the one or more deltas includes the actions i.e., insert or delete, as well as the characters required to convert a string into another. The one or more deltas are parsed and converted into alphanumeric identifiers, such that they could be read and understood. For example, OCR captured character sequence is R0000591913, corrected character sequence is R00005919B and the one or more deltas or the one or more common correction patterns captured for these sequences are: instruction set=[1,0,0], position set=[9,10,10] and variable=['B', '1', '3']. The one or more required changes corresponding to the one or more sets are insert 'B' at the $9^{th}$ position, delete '1' from the $10^{th}$ position and delete '3' from the $10^{th}$ position. In an embodiment of the present disclosure, for validating this strategy for an account, data is split into training data and test data. The training data is used for pattern capturing for the different customers and the test data is used for validating the same. In an embodiment of the present disclosure, the training data is grouped on the basis of 'Customer ID' and all such patterns are captured for the corrections done on the one or more mis-captured data fields.

In an embodiment of the present disclosure, in determining the one or more deltas associated with the one or more mis-captured data fields based on the obtained historical correction data by using the trained data correction-based ML model, the data determination module 216 obtains frequency of each of past instruction sets, past position sets and past variable sets associated with each of the one or more customers from the storage unit 206. In an embodiment of the present disclosure, the frequency is obtained by observing repetition of the one or more datasets or a pair of the one or more datasets. In an exemplary embodiment of the present disclosure, the past instruction sets, the past position sets and the past variable sets correspond to one or more corrections made by the one or more users to correct the wrongly captured data fields of the set of documents associated with the one or more customers. Further, the data determination module 216 determines combinations of the instruction set and the position set from the past instruction sets and the past position sets having highest occurrence up to a predefined threshold frequency based on the obtained frequency. The data determination module 216 combines the determined combinations with the variable set from the past variable sets having same length. Furthermore, the data determination module 216 determines the one or more deltas associated with the one or more mis-captured data fields for the one or more customers based on result of combination by using the trained data correction-based ML model. In an embodiment of the present disclosure, the trained data correction-based ML model is Ratcliff-Obershelp-based model. In an embodiment of the present disclosure, the one or more common correction patterns correspond to one or more required changes. In an exemplary embodiment of the present disclosure, the one or more required changes include deleting one or more characters from the one or more strings, adding one or more new characters in the one or more strings, replacing the one or more characters with the one or more new characters and the like. For example, the one or more common correction patterns are captured or learned to recommend correct data fields corresponding to the one or more mis-captured data fields with the help of the historical correction data upon occurrence of AMF. In an embodiment of the present disclosure, as from the data analysis it was encountered that there are a lot of inconsistencies for corrections made for different customer accounts, thus pattern capturing must be account specific i.e., different for different customer accounts. The ML-based computing system 104 targets capturing patterns in the one or more corrections made for different customers for accounts i.e., the ML-based computing system 104 tries to capture similarity in the way of correcting the one or more mis-captured data fields for similar customers. In an exemplary embodiment of the present disclosure, pattern capturing is done only for the incorrect invoice numbers without considering amounts and dates due to their frequencies in the log correction data and the special characters, such as '.', '-', ':', and the like, present in the amounts and dates. In an embodiment of the present disclosure, the idea behind capturing the one or more common correction patterns at customer level came from the heuristic of finding the ways in which one character sequence could be converted into another character sequence. In an exemplary embodiment of the present disclosure, pattern capturing is done by using a python's' difflib. The python's' difflib is a module that provides classes and functions for comparing sequences. In an embodiment of the present disclosure, the Ratcliff Obershelp model is used for the pattern matching to convert a character sequence into another in linear time.

Further, the data generation module 220 generates the set of correct data fields corresponding to each of the one or more mis-captured data fields based on the parsed one or more datasets by using the trained data correction-based ML model. Further, the data generation module 220 generates a confidence score for each of the set of correct data fields based on the parsed one or more datasets and frequency of each of the parsed one or more datasets by using the trained data correction-based ML model. In an embodiment of the present disclosure, the confidence score is a number that represents a likelihood for each of the set of correct data fields to be correct. Furthermore, the data generation module 220 outputs the generated set of correct data fields and the generated confidence score on user interface screen of the one or more electronic devices 102. In an embodiment of the present disclosure, the frequencies for the one or more deltas are determined at a customer level, such that the most frequent delta is given a relatively higher confidence score against being a correct modification or edit amongst all the one or more deltas available for a customer.

In an embodiment of the present disclosure, the data generation module 220 is configured to generate one or more correct data fields corresponding to the one or more mis-captured data fields based on the parsed one or more datasets by using the trained data correction-based ML model. In an embodiment of the present disclosure, the trained data correction-based ML model is a reinforcement learning-based Machine Learning (ML) model.

The data replacement module 224 is configured to automatically replace the one or more mis-captured data fields with the generated one or more correct data fields based on one or more predefined rules. In an embodiment of the present disclosure, the one or more predefined rules determines whether to automatically replace the one or more mis-captured data fields with the generated one or more correct data fields or output the set of correct data fields and the confidence score on user interface screen of the one or more electronic devices 102. In automatically replacing the one or more mis-captured data fields with the generated one or more correct data fields based on the one or more predefined rules, the data replacement module 224 generates a confidence score for each of the one or more correct data fields based on the parsed one or more datasets and the frequency of each of the parsed one or more datasets by using the trained data correction-based ML model. The data replacement module 224 determines if the generated confidence score is more than a predefined threshold score by comparing the generated confidence score with the predefined threshold score. Further, the data replacement module 224 automatically replaces the one or more mis-captured data fields with the generated one or more correct data fields upon determining that the obtained confidence score is more than the predefined threshold score. When the obtained confidence score is less than the predefined threshold score, the data generation module 220 outputs the generated set of correct data fields and the generated confidence score on user interface screen of the one or more electronic device.

In operation, the ML-based computing system 104 receives the one or more documents from the one or more electronic devices 102 associated with the one or more users. The ML-based computing system 104 scans the received one or more documents by using the document processing system 108 for obtaining the one or more mis-captured data fields present inside the received one or more documents. The ML-based computing system 104 obtains the historical correction data associated with the one or more customers from the storage unit 206. Further, the ML-based computing system 104 determines the one or more deltas associated with the one or more mis-captured data fields based on the obtained historical correction data by using the trained data correction-based ML model. The ML-based computing system 104 parses the determined one or more deltas into the one or more datasets by using the data parsing technique. The ML-based computing system 104 generates the one or more correct data fields corresponding to the one or more mis-captured data fields based on the parsed one or more datasets by using the trained data correction-based ML model. The ML-based computing system 104 automatically replaces the one or more mis-captured data fields with the generated one or more correct data fields based on the one or more predefined rules.

FIG. 3 is an exemplary remittance image 302 including the set of data fields, in accordance with an embodiment of the present disclosure. As shown in FIG. 3, the set of data fields include invoice, description, date, gross amount, discount, and net amount.

Figure 4A:
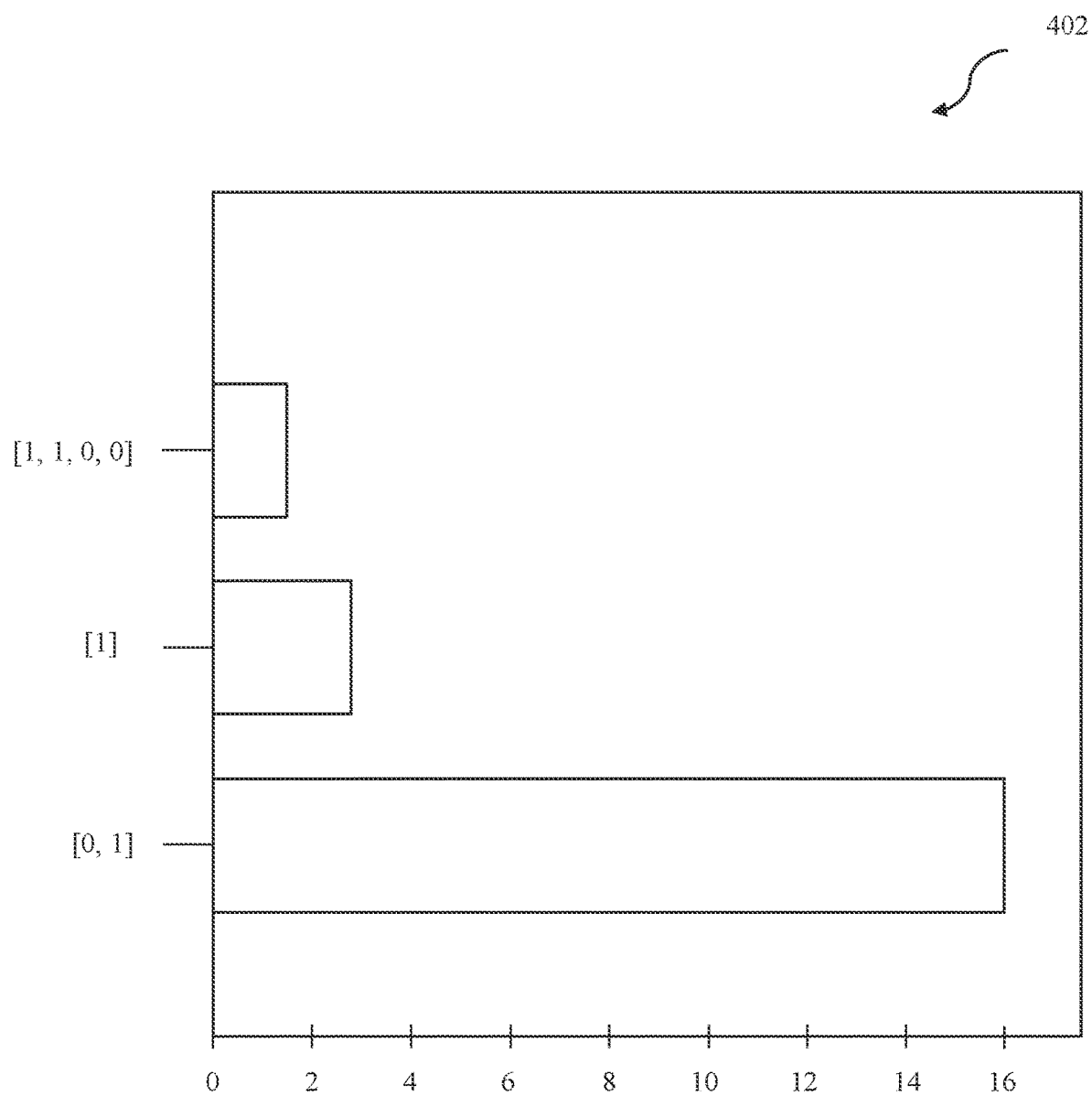
FIG. 4A is exemplary graph depicting instruction frequency plot, in accordance with an embodiment of the present disclosure.
Figure 4B:
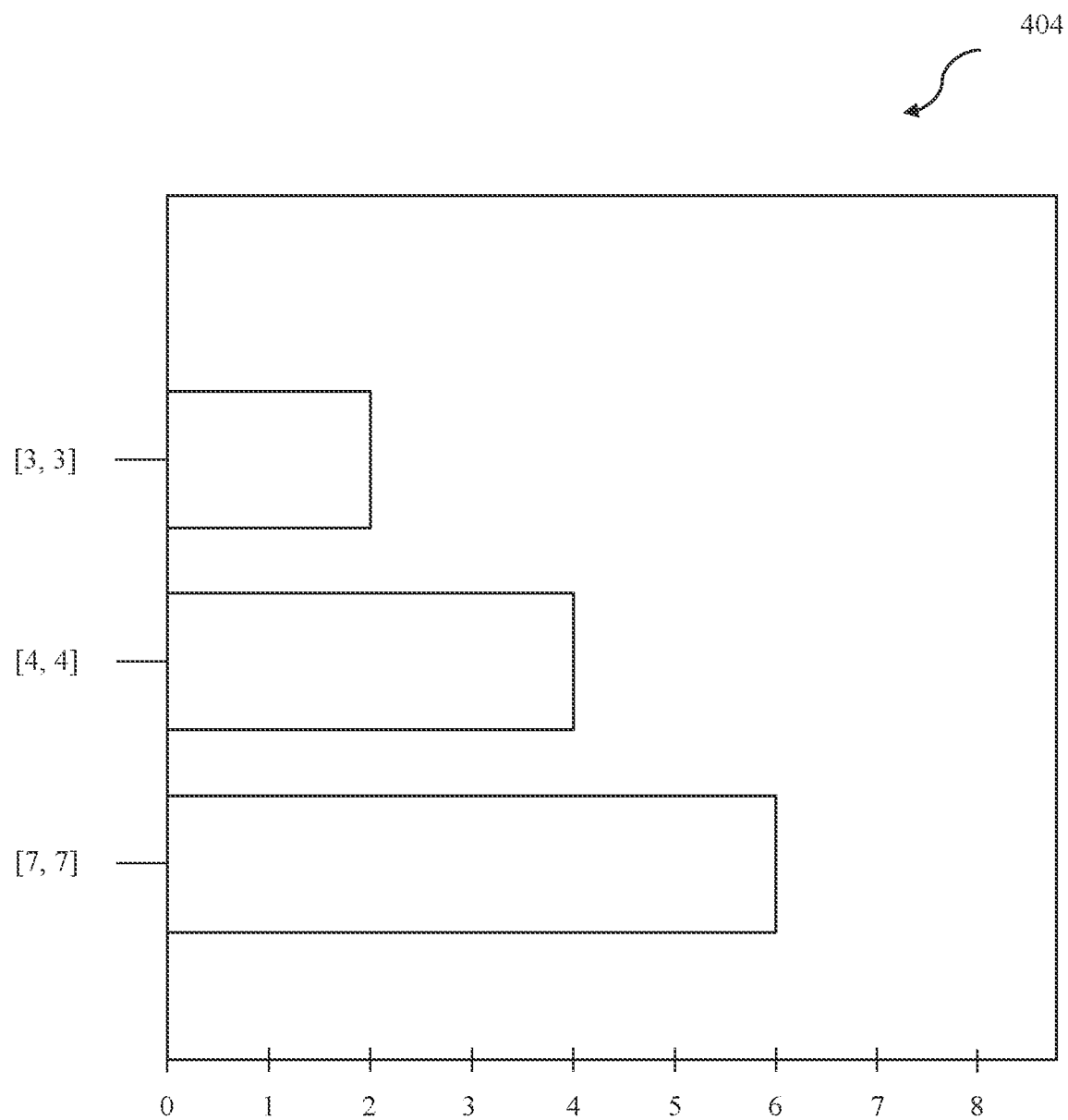
FIG. 4B is exemplary graph depicting position frequency plot, in accordance with an embodiment of the present disclosure.
Figure 4C:
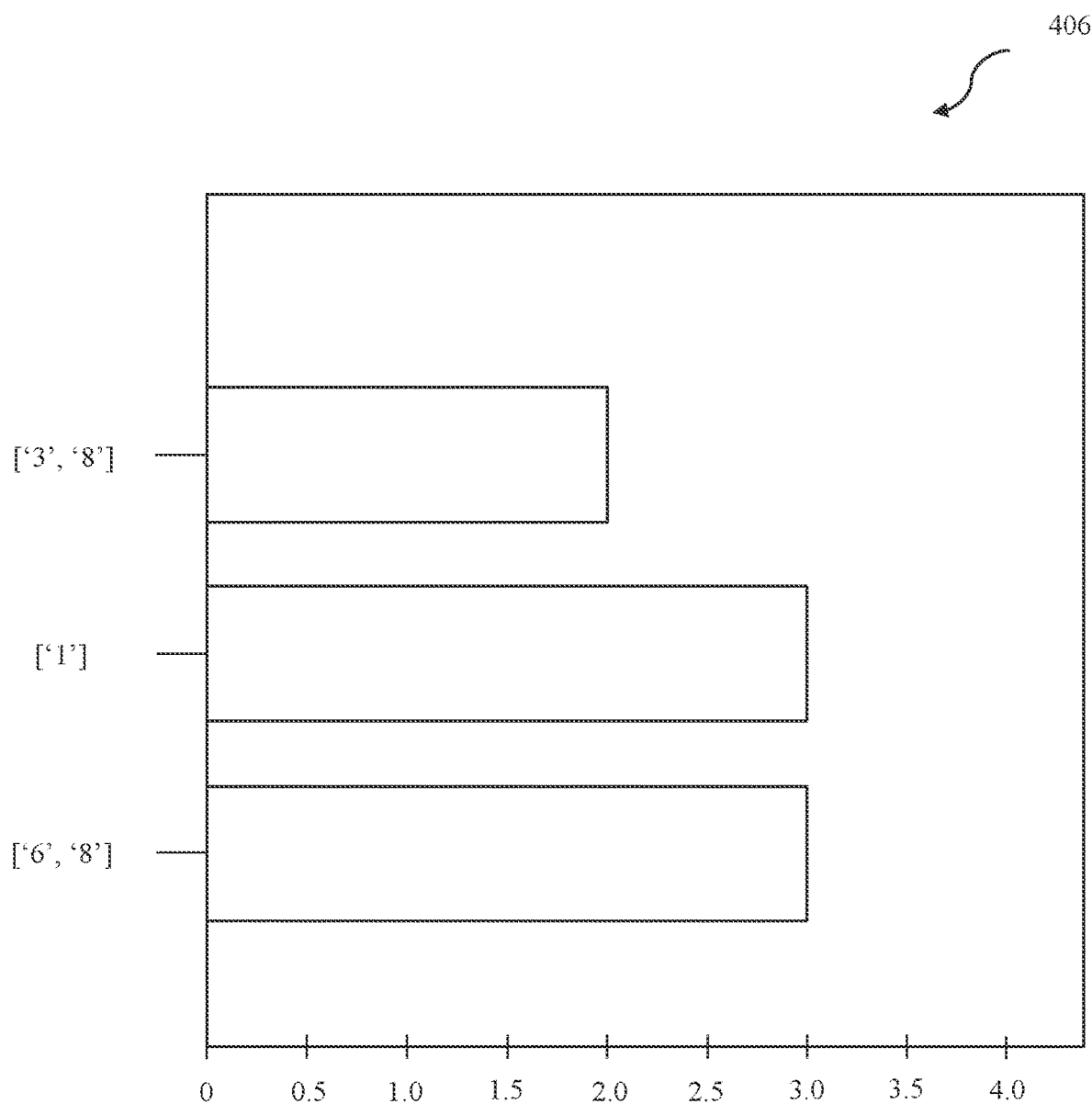
FIG. 4C is exemplary graph depicting variable plot, in accordance with an embodiment of the present disclosure.

FIG. 4A is exemplary graph 402 depicting instruction frequency plot, in accordance with an embodiment of the present disclosure. Further, FIG. 4B is exemplary graph 404 depicting position frequency plot, in accordance with an embodiment of the present disclosure. FIG. 4C is exemplary graph 406 depicting variable plot, in accordance with an embodiment of the present disclosure. For the sake of brevity, FIGS. 4A-4C have been explained together.

In an embodiment of the present disclosure, the graphs depicted in FIGS. 4A-4C belong to a customer having total 24 corrections i.e., total entries for the customer are 24. The graphs 402, 404, 406 represent frequencies of instruction set, position set and variable set that are obtained for observing repetition of these datasets or even pair of these datasets. In FIG. 4A, the instruction set [0,1] gets repeated the most i.e., 16 times. Further in FIG. 4B, the position set [7, 7] gets repeated the most i.e., 6 times. Furthermore in FIG. 4C, the variable set ['6', '8'] and ['1'] gets repeated the most i.e., 3 times. From these results, the combinations of instruction set, and position set are taken having the highest frequency of occurrence up to some 'n' threshold and are combined with the variables from the variable having the same length to compute the one or more common correction patterns for the customer. Each of the one or more common correction patterns is responsible for giving one suggestion for the mis-captured data field. These captured one or more common correction patterns when validated across the test data gave the following experimental results:

| Account | Accuracy |
|---|---|
| XPO | 73% |
| Compass Group | 32% |
| Tyson | 54% |
| Penske | 83% |
| WattsWater | 84% |
| Jonnie Walker_70256 | 77% |

In an embodiment of the present disclosure, the accuracy in table is measured in terms of predicting a correct suggestion for the mis-captured data field. In an exemplary embodiment of the present disclosure, the threshold for pairing the instruction set and the position set is taken as 3 i.e., the top 3 most frequent instruction-position pairs are taken into consideration for capturing a common correction pattern for the customer.

Figure 5:
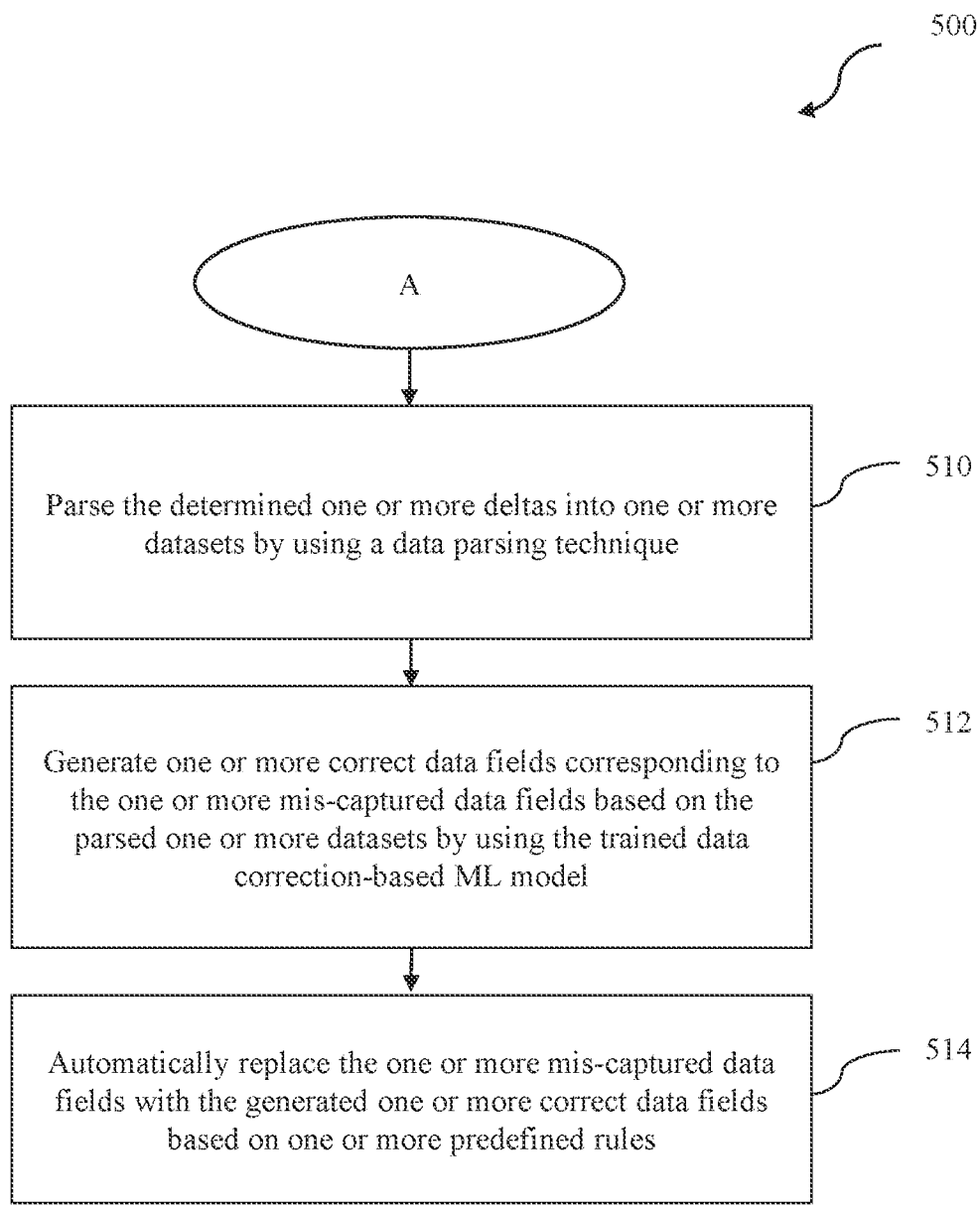
FIG. 5 is a process flow diagram illustrating an exemplary ML-based method for facilitating correction of data in documents, in accordance with an embodiment of the present disclosure.

FIG. 5 is a process flow diagram illustrating an exemplary ML-based method 500 for facilitating correction of data in documents, in accordance with an embodiment of the present disclosure. At step 502, one or more documents are received from one or more electronic devices 102 associated with one or more users. In an exemplary embodiment of the present disclosure, the one or more users may include one or more analysts, business analysts, cash analysts, financial analysts and the like. In an exemplary embodiment of the present disclosure, the one or more electronic devices 102 may include a laptop computer, desktop computer, tablet computer, smartphone, wearable device, smart watch and the like. In an embodiment of the present disclosure, the one or more documents may be one or more invoices, one or more remittance documents and the like. The one or more documents are associated with one or more customers of the one or more users. In an embodiment of the present disclosure, the one or more customers share the one or more remittance documents with the one or more users to close one or more invoices raised against them. In an embodiment of the present disclosure, the one or more documents are in one or more formats. For example, the one or more formats include Portable Document Format (PDF), Joint Photographic Expert Group image (JPEG), Portable Network Graphics (PNG), Scalable Vector Graphics (SVG), and Web Picture format (WebP) and the like. In an exemplary embodiment of the present disclosure, the one or more documents include handwritten information, machine printed information, and the like.

At step 504, the received one or more documents are scanned by using a document processing system 108 for obtaining one or more mis-captured data fields present inside the received one or more documents. For example, the data processing system may be an OCR engine. In an embodiment of the present disclosure, the OCR engine is a technology that recognizes text inside images and scanned documents. In an embodiment of the present disclosure, the one or more mis-captured data fields are data fields inside the received one or more documents for which the OCR engine fails to recognize a set of characters while scanning the received one or more documents. In an embodiment of the present disclosure, the one or more mis-captured data fields are in the form of one or more strings. Further, each of the one or more strings includes a set of characters. For example, the one or more strings include letters, numerical digits, whitespaces, special characters, and the like. In scanning the received one or more documents by using the document processing system 108 for obtaining the one or more mis-captured data fields present inside the received one or more documents, the ML-based method 500 includes extracting a set of data fields from the received one or more documents by using the document processing system 108. For example, the set of data fields may include invoice numbers, amount, invoice dates, discount amount, descriptions, customer's name, address and the like. Furthermore, ML-based method 500 includes comparing the set of data fields of the received one or more documents with one or more data fields of one or more AR documents. For example, the one or more AR documents may be invoices. The ML-based method 500 includes determining if the set of data fields are identical to the one or more data fields based on result of comparison. The ML-based method 500 includes determining the one or more mis-captured data fields in the received one or more documents upon determining that the set of data fields are not identical to the one or more data fields. In an exemplary embodiment of the present disclosure, the one or more mis-captured data fields include invoice numbers, amount, invoice dates, discount amount, descriptions, customer's name, address, or a combination thereof. For example, the set of data fields are compared with the one or more data fields to close an open AR. When the result of comparison indicates that the set of data fields are not identical to the one or more data fields, the set of data fields are flagged with an AR Match Failed (AMF) exception tag. In an embodiment of the present disclosure, the AMF exception tag corresponds to a matching entry for a given payment that is not found in open AR and hence fail to close the invoice.

At step 506, a historical correction data associated with the one or more customers is obtained from a storage unit 206. In an embodiment of the present disclosure, the historical correction data corresponds to one or more corrections made by the one or more users to correct wrongly captured data fields of a set of documents associated with the one or more customers. The set of documents are past remittance documents associated with the one or more customers. For example, the one or more corrections may include removing a character from character strings of the wrongly captured data fields, adding a character in the character strings of the wrongly captured data fields and the like. In an embodiment of the present disclosure, the historical correction data is stored as log correction data in the storage unit 206. The Log correction data is captured for respective customer account and is cleaned as there is a likelihood of a lot of empty fields for both captured fields and corrected fields along with customer ID's. For example, when the log correction data includes cases where the captured fields and the corrected fields are having the same value, these cases are also removed.

In an embodiment of the present disclosure, upon analyzing the log correction data and the one or more data fields of the one or more AR documents, one or more observations are derived. The one or more observations include that the one or more corrections are made on both header and item level record. Further, the one or more observations include that the invoice number may be alphanumeric set of characters, such as 607189628, 557508854, 9R57C5748 and the like but majorly contains digits only. The one or more observations also include that incorrectly captured fields mainly include invoice numbers, amount, and invoice dates. The data is very high dimensional. Furthermore, the one or more observations include that remittance often includes close contenders for payment number, such as check number, credit memo number, advice number and the like. In an exemplary embodiment of the present disclosure, a data correction-based ML model is trained based on captured reference numbers. Further, the one or more observations include that probability estimation for an invoice number may include huge number of classes. For example, for an invoice number of length 10 there may be 35 such classes (26 letters and 10 digits) for correcting a single character. Thus, if there are 3 or 4 indexes where the OCR has mis-captured the characters, this class sample space may be too high. In an embodiment of the present disclosure, there are a lot of places where the captured field and corrected field values are the same. Thus, these cases are ignored for solution and capturing patterns. In an embodiment of the present disclosure, the one or more observations are considered while determining one or more deltas.

At step 508, the one or more deltas associated with the one or more mis-captured data fields are determined based on the obtained historical correction data by using a trained data correction-based ML model. In an exemplary embodiment of the present disclosure, the one or more deltas are used as one or more common correction patterns to be applied on the one or more strings of the one or more mis-captured data fields to correct the one or more mis-captured data fields. In an embodiment of the present disclosure, a string-matching technique may be used to find the difference between two string values. These differences i.e., the one or more deltas are then used as the one or more common correction patterns that could be applied to the one or more mis-captured data fields to correct them.

In an embodiment of the present disclosure, the one or more deltas are human readable differences to be applied on the on the one or more strings of the one or more mis-captured data fields to correct the one or more mis-captured data fields. Each line of the one or more deltas begins with a two-letter code having one or more meanings. For example, when a first character sequence i.e., a mis-captured data field is required to be converted to a second character sequence i.e., a correct data field, '−' represents a character unique to the first character sequence. Further, '+' represents a character unique to the second character sequence. Furthermore, ' ' represents a character common to both the first character sequence and the second character sequence. '?' represents a character absent in both the first character sequence and the second character sequence.

At step 510, the determined one or more deltas are parsed or encoded into one or more datasets by using a data parsing technique. In an exemplary embodiment of the present disclosure, the one or more datasets include an instruction set, a position set and a variable set. The one or more datasets are human readable datasets. Further, the instruction set is a binary encoding used to insert or delete a character. In an embodiment of the present disclosure, the instruction set includes a set of instructions that is required to be applied to a sequence to change it to another sequence. The set of instructions include digits '0''s i.e., deleting a character and '1''s i.e., inserting a character. The position set represents a string index at which the character gets deleted or inserted into. In an embodiment of the present disclosure, the position set includes logical indices from where to delete or insert the character based on the set of instructions. Furthermore, the variable set is the character that gets inserted or deleted from the position set. In an embodiment of the present disclosure, all the instruction set, the position set, and the variable set must be in accordance with their indices i.e., an instruction at index 'x' is meant for deleting or inserting the variable read from index 'x' from the position read from the index 'x'. In an exemplary embodiment of the present disclosure, the one or more deltas includes the actions i.e., insert or delete, as well as the characters required to convert a string into another. The one or more deltas are parsed and converted into alphanumeric identifiers, such that they could be read and understood. For example, OCR captured character sequence is R0000591913, corrected character sequence is R00005919B and the one or more deltas or the one or more common correction patterns captured for these sequences are: instruction set=[1,0,0], position set=[9,10,10] and variable=['B', '1', '3']. The one or more required changes corresponding to the one or more sets are insert 'B' at the $9^{th}$ position, delete '1' from the $10^{th}$ position and delete '3' from the $10^{th}$ position. In an embodiment of the present disclosure, for validating this strategy for an account, data is split into training data and test data. The training data is used for pattern capturing for the different customers and the test data is used for validating the same. In an embodiment of the present disclosure, the training data is grouped on the basis of 'Customer ID' and all such patterns are captured for the corrections done on the one or more mis-captured data fields.

In an embodiment of the present disclosure, in determining the one or more deltas associated with the one or more mis-captured data fields based on the obtained historical correction data by using the trained data correction-based ML model, the ML-based method 500 includes obtaining frequency of each of past instruction sets, past position sets and past variable sets associated with each of the one or more customers from the storage unit 206. In an embodiment of the present disclosure, the frequency is obtained by observing repetition of the one or more datasets or a pair of the one or more datasets. In an exemplary embodiment of the present disclosure, the past instruction sets, the past position sets and the past variable sets correspond to one or more corrections made by the one or more users to correct the wrongly captured data fields of the set of documents associated with the one or more customers. Further, the ML-based method 500 includes determining combinations of the instruction set and the position set from the past instruction sets and the past position sets having highest occurrence up to a predefined threshold frequency based on the obtained frequency. The ML-based method 500 includes combining the determined combinations with the variable set from the past variable sets having same length. Furthermore, the ML-based method 500 includes determining the one or more deltas associated with the one or more mis-captured data fields for the one or more customers based on result of combination by using the trained data correction-based ML model. In an embodiment of the present disclosure, the trained data correction-based ML model is Ratcliff-Obershelp-based model. In an embodiment of the present disclosure, the one or more common correction patterns correspond to one or more required changes. In an exemplary embodiment of the present disclosure, the one or more required changes include deleting one or more characters from the one or more strings, adding one or more new characters in the one or more strings, replacing the one or more characters with the one or more new characters and the like. For example, the one or more common correction patterns are captured or learned to recommend correct data fields corresponding to the one or more mis-captured data fields with the help of the historical correction data upon occurrence of AMF. In an embodiment of the present disclosure, as from the data analysis it was encountered that there are a lot of inconsistencies for corrections made for different customer accounts, thus pattern capturing must be account specific i.e., different for different customer accounts. The ML-based computing system 104 targets capturing patterns in the one or more corrections made for different customers for accounts i.e., the ML-based computing system 104 tries to capture similarity in the way of correcting the one or more mis-captured data fields for similar customers. In an exemplary embodiment of the present disclosure, pattern capturing is done only for the incorrect invoice numbers without considering amounts and dates due to their frequencies in the log correction data and the special characters, such as '.', '-', ':', and the like, present in the amounts and dates. In an embodiment of the present disclosure, the idea behind capturing the one or more common correction patterns at customer level came from the heuristic of finding the ways in which one character sequence could be converted into another character sequence. In an exemplary embodiment of the present disclosure, pattern capturing is done by using a python's' difflib. The python's' difflib is a module that provides classes and functions for comparing sequences. In an embodiment of the present disclosure, the Ratcliff Obershelp model is used for the pattern matching to convert a character sequence into another in linear time.

In an embodiment of the present disclosure, a set of correct data fields corresponding to each of the one or more mis-captured data fields are generated based on the parsed one or more datasets by using the trained data correction-based ML model. Further, the ML-based method 500 includes generating a confidence score for each of the set of correct data fields based on the parsed one or more datasets and frequency of each of the parsed one or more datasets by using the trained data correction-based ML model. In an embodiment of the present disclosure, the confidence score is a number that represents a likelihood for each of the set of correct data fields to be correct. Furthermore, the ML-based method 500 includes outputting the generated set of correct data fields and the generated confidence score on user interface screen of the one or more electronic devices 102. In an embodiment of the present disclosure, the frequencies for the one or more deltas are determined at a customer level, such that the most frequent delta is given a relatively higher confidence score against being a correct modification or edit amongst all the one or more deltas available for a customer.

At step 512, one or more correct data fields corresponding to the one or more mis-captured data fields are generated based on the parsed one or more datasets by using the trained data correction-based ML model. In an embodiment of the present disclosure, the trained data correction-based ML model is a reinforcement learning-based ML model.

At step 514, the one or more mis-captured data fields are automatically replaced with the generated one or more correct data fields based on one or more predefined rules. In an embodiment of the present disclosure, the one or more predefined rules determines whether to automatically replace the one or more mis-captured data fields with the generated one or more correct data fields or output the set of correct data fields and the confidence score on user interface screen of the one or more electronic devices 102. In automatically replacing the one or more mis-captured data fields with the generated one or more correct data fields based on the one or more predefined rules, the ML-based method 500 includes generating a confidence score for each of the one or more correct data fields based on the parsed one or more datasets and the frequency of each of the parsed one or more datasets by using the trained data correction-based ML model. The ML-based method 500 includes determining if the generated confidence score is more than a predefined threshold score by comparing the generated confidence score with the predefined threshold score. Further, the ML-based method 500 includes automatically replacing the one or more mis-captured data fields with the generated one or more correct data fields upon determining that the obtained confidence score is more than the predefined threshold score. When the obtained confidence score is less than the predefined threshold score, the generated set of correct data fields and the generated confidence score are outputted on user interface screen of the one or more electronic device.

The method 500 may be implemented in any suitable hardware, software, firmware, or combination thereof.

Figure 6:
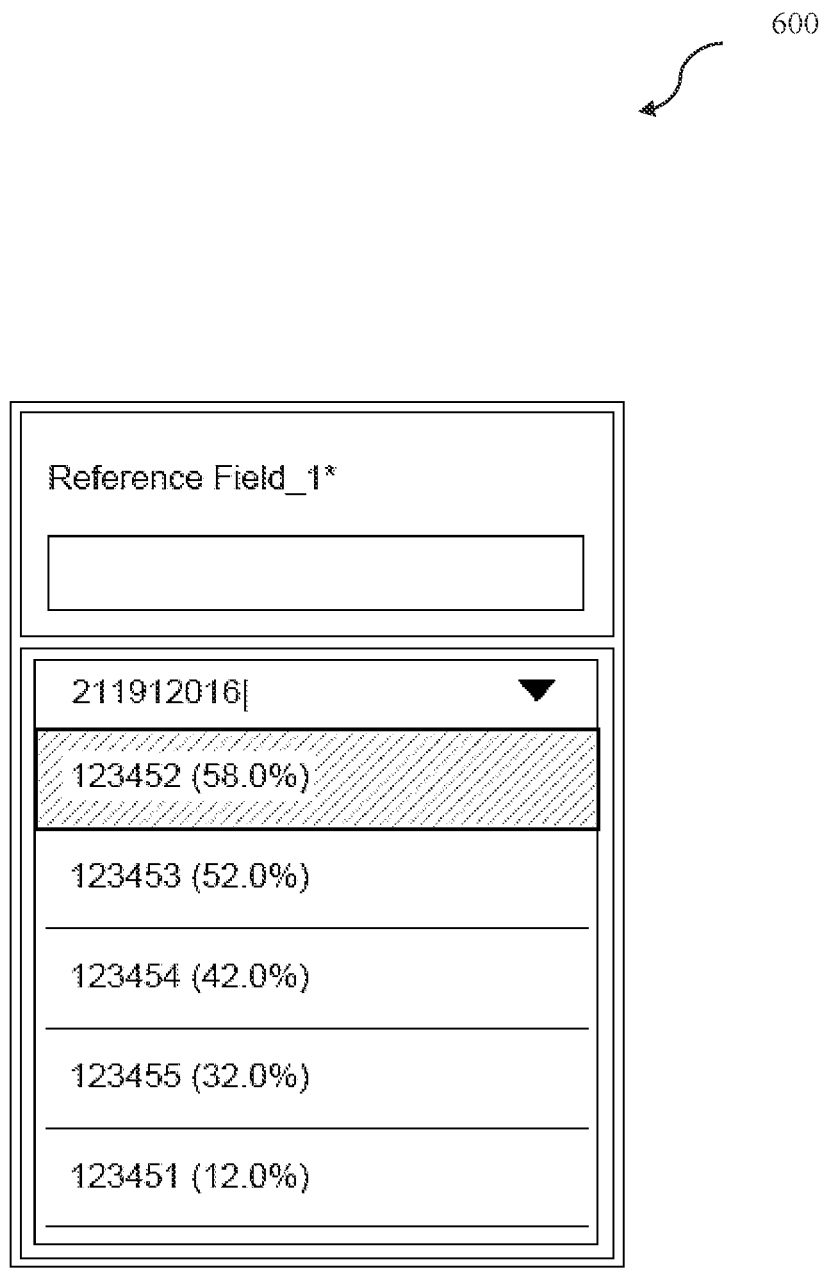
FIG. 6 is a graphical user interface screen of the exemplary computing system for facilitating correction of data in documents, in accordance with an embodiment of the present disclosure.

FIG. 6 is a graphical user interface screen 600 of the exemplary computing system for facilitating correction of data in documents, in accordance with an embodiment of the present disclosure. The graphical user interface screen 600 displays the set of correct data fields and the confidence score for each of the set of correct data fields. In the current scenario, the confidence score is in a percentage format.

Thus, various embodiments of the present ML-based computing system 104 provide a solution to facilitate correction of data in documents. In an embodiment of the present disclosure, the ML-based computing system 104 performs exception handling in cash application by correcting information captured incorrectly, primarily reference numbers and corresponding amounts. Incorrectly captured reference numbers may lead to AMF. The ML-based computing system 104 proposes a solution to suggest probable reference numbers to AMF reference numbers by leveraging past correction behavior, thus helping in quick and effective correction of AMF reference numbers. In an embodiment of the present disclosure, the one or more common correction patterns are determined to suggest probable reference fields when upon AMF by the help of previous correction data present. Thus, when the one or more common correction patterns are captured or learned in previous corrections, then some suggestions could be made for incorrectly captured fields. In an embodiment of the present disclosure, the ML-based computing system 104 helps saving the cash analyst time by giving all possible suggestions that could have been the correct value or identifier if the OCR would have captured it correctly. This probabilistic approach also adds a confidence score against each suggestion being a correct suggestion. Conventionally, this problem was handled by manually correcting the reference fields using the remittance documents as the source of truth. However, the ML-based computing system 104 first narrows down the problem making it effective only on suggesting reference fields which targets most of the problem. Also, the computing system 104 is inclined towards learning from those user/analyst interactions or making use of the user's exception handling behavior which makes it an in-house proprietary method. In an embodiment of the present disclosure, the ML-based computing system 104 helps to learn from the past corrections made on the same customer data for suggesting a correction on an incorrectly captured identifier and also assigns a probability score to each suggestion. Hence, whenever the cash analyst observes an OCR mis-capture against the similar customer for which the past correction patterns are captured, some suggestions may be obtained against the mis-capture.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A Machine Learning (ML)-based computing system for facilitating correction of data in documents, the ML-based computing system comprising:
  one or more hardware processors; and
  a memory coupled to the one or more hardware processors, wherein the memory comprises a plurality of modules in the form of programmable instructions executable by the one or more hardware processors, and wherein the plurality of modules comprises:
    a data receiver module configured to receive one or more documents from one or more electronic devices associated with one or more users, wherein the one or more documents are associated with one or more customers of the one or more users;
    a data processing module configured to scan the received one or more documents by using a document processing system for obtaining one or more mis-captured data fields present inside the received one or more documents, wherein the one or more mis-captured data fields are in the form of one or more strings, and wherein each of the one or more strings comprises a set of characters;

a data obtaining module configured to obtain a historical correction data associated with the one or more customers from a storage unit, wherein the historical correction data corresponds to one or more corrections made by the one or more users to correct wrongly captured data fields of a set of documents associated with the one or more customers;

a data determination module configured to determine one or more deltas associated with the one or more mis-captured data fields based on the obtained historical correction data by using a trained data correction-based ML model, wherein the one or more deltas are used as one or more common correction patterns to be applied on the one or more strings of the one or more mis-captured data fields to correct the one or more mis-captured data fields;

a data parsing module configured to parse the determined one or more deltas into one or more datasets by using a data parsing technique, wherein the one or more datasets comprise: an instruction set, a position set and a variable set, and wherein the one or more datasets are human readable datasets;

a data generation module configured to generate one or more correct data fields corresponding to the one or more mis-captured data fields based on the parsed one or more datasets by using the trained data correction-based ML model; and a data replacement module configured to automatically replace the one or more mis-captured data fields with the generated one or more correct data fields based on one or more predefined rules.

2. The ML-based computing system of claim 1, wherein the one or more strings comprise letters, numerical digits, whitespaces, and special characters.

3. The ML-based computing system of claim 1, wherein the one or more common correction patterns correspond to one or more required changes, and wherein the one or more required changes comprise deleting one or more characters from the one or more strings, adding one or more new characters in the one or more strings, and replacing the one or more characters with the one or more new characters.

4. The ML-based computing system of claim 1, wherein the instruction set is a binary encoding used to one of: insert and delete a character, wherein the position set represents a string index at which the character gets one of: deleted and inserted into, and wherein the variable set is the character that gets one of: inserted and deleted.

5. The ML-based computing system of claim 1, wherein the data generation module is configured to:
generate a set of correct data fields corresponding to each of the one or more mis-captured data fields based on the parsed one or more datasets by using the trained data correction-based ML model;
generate a confidence score for each of the set of correct data fields based on the parsed one or more datasets and frequency of each of the parsed one or more datasets by using the trained data correction-based ML model, wherein the confidence score is a number that represents a likelihood for each of the set of correct data fields to be correct; and
output the generated set of correct data fields and the generated confidence score on user interface screen of the one or more electronic devices.

6. The ML-based computing system of claim 1, wherein in automatically replacing the one or more mis-captured data fields with the generated one or more correct data fields based on the one or more predefined rules, the data replacement module is configured to:
generate a confidence score for each of the one or more correct data fields based on the parsed one or more datasets and frequency of each of the parsed one or more datasets by using the trained data correction-based ML model;
determine if the generated confidence score is more than a predefined threshold score by comparing the generated confidence score with the predefined threshold score; and
automatically replace the one or more mis-captured data fields with the generated one or more correct data fields upon determining that the obtained confidence score is more than the predefined threshold score.

7. The ML-based computing system of claim 1, wherein the one or more documents comprise handwritten information and machine printed information.

8. The ML-based computing system of claim 1, wherein in scanning the received one or more documents by using the document processing system for obtaining the one or more mis-captured data fields present inside the received one or more documents, the data processing module is configured to:
extract a set of data fields from the received one or more documents by using the document processing system, wherein the received one or more documents comprise one or more remittance documents;
compare the set of data fields of the received one or more documents with one or more data fields of one or more Accounts Receivable (AR) documents;
determine if the set of data fields are identical to the one or more data fields based on result of comparison; and
determine the one or more mis-captured data fields in the received one or more documents upon determining that the set of data fields are not identical to the one or more data fields, wherein the one or more mis-captured data fields comprise at least one of: invoice numbers, amount, invoice dates, discount amount, descriptions, customer's name and address.

9. The ML-based computing system of claim 1, wherein in determining the one or more deltas associated with the one or more mis-captured data fields based on the obtained historical correction data by using the trained data correction-based ML model, the data determination module is configured to:
obtain frequency of each of past instruction sets, past position sets and past variable sets associated with each of the one or more customers from a storage unit, wherein the past instruction sets, the past position sets and the past variable sets correspond to one or more corrections made by the one or more users to correct the wrongly captured data fields of the set of documents associated with the one or more customers;
determine combinations of the instruction set and the position set from the past instruction sets and the past position sets having highest occurrence up to a predefined threshold frequency based on the obtained frequency;
combine the determined combinations with the variable set from the past variable sets having same length; and
determine the one or more deltas associated with the one or more mis-captured data fields for the one or more customers based on result of combination by using the trained data correction-based ML model, wherein the trained data correction-based ML model is Ratcliff-Obershelp-based model.

10. A Machine Learning (ML)-based method for facilitating correction of data in documents, the ML-based method comprising:

receiving, by one or more hardware processors, one or more documents from one or more electronic devices associated with one or more users, wherein the one or more documents are associated with one or more customers of the one or more users;

scanning, by the one or more hardware processors, the received one or more documents by using a document processing system for obtaining one or more mis-captured data fields present inside the received one or more documents, wherein the one or more mis-captured data fields are in the form of one or more strings, and wherein each of the one or more strings comprises a set of characters;

obtaining, by the one or more hardware processors, a historical correction data associated with the one or more customers from a storage unit, wherein the historical correction data corresponds to one or more corrections made by the one or more users to correct wrongly captured data fields of a set of documents associated with the one or more customers;

determining, by the one or more hardware processors, one or more deltas associated with the one or more mis-captured data fields based on the obtained historical correction data by using a trained data correction-based ML model, wherein the one or more deltas are used as one or more common correction patterns to be applied on the one or more strings of the one or more mis-captured data fields to correct the one or more mis-captured data fields;

parsing, by the one or more hardware processors, the determined one or more deltas into one or more datasets by using a data parsing technique, wherein the one or more datasets comprise; an instruction set, a position set and a variable set, and wherein the one or more datasets are human readable datasets;

generating, by the one or more hardware processors, one or more correct data fields corresponding to the one or more mis-captured data fields based on the parsed one or more datasets by using the trained data correction-based ML model; and automatically replacing, by the one or more hardware processors, the one or more mis-captured data fields with the generated one or more correct data fields based on one or more predefined rules.

11. The ML-based method of claim 10, wherein the one or more strings comprise letters, numerical digits, whitespaces, and special characters.

12. The ML-based method of claim 10, wherein the one or more common correction patterns correspond to one or more required changes, and wherein the one or more required changes comprise deleting one or more characters from the one or more strings, adding one or more new characters in the one or more strings, and replacing the one or more characters with the one or more new characters.

13. The ML-based method of claim 10, wherein the instruction set is a binary encoding used to one of: insert and delete a character, wherein the position set represents a string index at which the character gets one of: deleted and inserted into, and wherein the variable set is the character that gets one of: inserted and deleted.

14. The ML-based method of claim 10, further comprising:

generating a set of correct data fields corresponding to each of the one or more mis-captured data fields based on the parsed one or more datasets by using the trained data correction-based ML model;

generating a confidence score for each of the set of correct data fields based on the parsed one or more datasets and frequency of each of the parsed one or more datasets by using the trained data correction-based ML model, wherein the confidence score is a number that represents a likelihood for each of the set of correct data fields to be correct; and outputting the generated set of correct data fields and the generated confidence score on user interface screen of the one or more electronic devices.

15. The ML-based method of claim 10, wherein automatically replacing the one or more mis-captured data fields with the generated one or more correct data fields based on the one or more predefined rules comprises:

generating a confidence score for each of the one or more correct data fields based on the parsed one or more datasets and frequency of each of the parsed one or more datasets by using the trained data correction-based ML model;

determining if the generated confidence score is more than a predefined threshold score by comparing the generated confidence score with the predefined threshold score; and automatically replacing the one or more mis-captured data fields with the generated one or more correct data fields upon determining that the obtained confidence score is more than the predefined threshold score.

16. The ML-based method of claim 10, wherein the one or more documents comprise handwritten information and machine printed information.

17. The ML-based method of claim 10, wherein scanning the received one or more documents by using the document processing system for obtaining the one or more mis-captured data fields present inside the received one or more documents comprises:

extracting a set of data fields from the received one or more documents by using the document processing system, wherein the received one or more documents comprise one or more remittance documents;

comparing the set of data fields of the received one or more documents with one or more data fields of one or more Accounts Receivable (AR) documents;

determining if the set of data fields are identical to the one or more data fields based on result of comparison; and determining the one or more mis-captured data fields in the received one or more documents upon determining that the set of data fields are not identical to the one or more data fields, wherein the one or more mis-captured data fields comprise at least one of: invoice numbers, amount, invoice dates, discount amount, descriptions, customer's name and address.

18. The ML-based method of claim 10, wherein determining the one or more deltas associated with the one or more mis-captured data fields based on the obtained historical correction data by using the trained data correction-based ML model comprises:

obtaining frequency of each of past instruction sets, past position sets and past variable sets associated with each of the one or more customers from a storage unit, wherein the past instruction sets, the past position sets and the past variable sets correspond to one or more corrections made by the one or more users to correct the wrongly captured data fields of the set of documents associated with the one or more customers;

determining combinations of the instruction set and the position set from the past instruction sets and the past position sets having highest occurrence up to a predefined threshold frequency based on the obtained frequency;

combining the determined combinations with the variable set from the past variable sets having same length; and determining the one or more deltas associated with the one or more mis-captured data fields for the one or more customers based on result of combination by using the trained data correction-based ML model, wherein the trained data correction-based ML model is Ratcliff-Obershelp-based model.

19. A non-transitory computer-readable storage medium having instructions stored therein that, when executed by a hardware processor, cause the processor to perform method steps comprising:

receiving one or more documents from one or more electronic devices associated with one or more users, wherein the one or more documents are associated with one or more customers of the one or more users;

scanning the received one or more documents by using a document processing system for obtaining one or more mis-captured data fields present inside the received one or more documents, wherein the one or more mis-captured data fields are in the form of one or more strings, and wherein each of the one or more strings comprises a set of characters;

obtaining a historical correction data associated with the one or more customers from a storage unit, wherein the historical correction data corresponds to one or more corrections made by the one or more users to correct wrongly captured data fields of a set of documents associated with the one or more customers;

determining one or more deltas associated with the one or more mis-captured data fields based on the obtained historical correction data by using a trained data correction-based ML model, wherein the one or more deltas are used as one or more common correction patterns to be applied on the one or more strings of the one or more mis-captured data fields to correct the one or more mis-captured data fields;

parsing the determined one or more deltas into one or more datasets by using a data parsing technique, wherein the one or more datasets comprise: an instruction set, a position set and a variable set, and wherein the one or more datasets are human readable datasets;

generating one or more correct data fields corresponding to the one or more mis-captured data fields based on the parsed one or more datasets by using the trained data correction-based ML model; and automatically replacing the one or more mis-captured data fields with the generated one or more correct data fields based on one or more predefined rules.

20. The non-transitory computer-readable storage medium of claim 19, wherein the instruction set is a binary encoding used to one of: insert and delete a character, wherein the position set represents a string index at which the character gets one of: deleted and inserted into, and wherein the variable set is the character that gets one of: inserted and deleted.

* * * * *